United States Patent [19]

Levine

[11] 3,971,025
[45] July 20, 1976

[54] AIRPORT GROUND SURVEILLANCE SYSTEM WITH AIRCRAFT TAXI CONTROL FEATURE

[75] Inventor: Arnold M. Levine, Chatsworth, Calif.

[73] Assignee: International Telephone and Telegraph Corporation, New York, N.Y.

[22] Filed: Jan. 27, 1975

[21] Appl. No.: 544,194

Related U.S. Application Data

[62] Division of Ser. No. 320,089, Jan. 2, 1973, Pat. No. 3,872,474.

[52] U.S. Cl. ............................. 343/108 R; 340/26; 180/98
[51] Int. Cl.² ........................ G01S 1/16; G01S 1/18
[58] Field of Search .......... 343/5 PD, 5 LS, 112 TC, 343/108; 340/26; 180/98

[56] References Cited
UNITED STATES PATENTS

| | | | |
|---|---|---|---|
| 2,536,496 | 1/1951 | Falloon | 343/5 LS |
| 2,920,320 | 1/1960 | Ross | 343/5 LS |
| 3,414,900 | 12/1968 | Steinhauser | 343/108 R |
| 3,460,066 | 8/1969 | Seashore et al. | 340/26 |

Primary Examiner—Maynard R. Wilbur
Assistant Examiner—T. M. Blum
Attorney, Agent, or Firm—William T. O'Neil

[57] ABSTRACT

A system for detecting, monitoring the movements of, and controlling the travel of aircraft and other vehicles on an airport surface. A series of small low-powered radar transmit-receive devices, each having a limited range, is disposed essentially in a line along alternate and opposite sides of a runway, ramp or taxiway. Control pulses at a system PRF travelling down the inter-connecting cables serve to cause the individual radars to "blink" in sequence in accordance with the inherent delay in the inter-connecting cable. Frequency separation is used to prevent false indications due to transmit-receive inter-action among the individual miniature radars. The system is adapted to data presentation in accordance with standard radar display techniques, or alternatively, a display is provided on a synthesized map of the airport. A pulse delay discriminator arrangement provides for discrete lateral position control. Means are also shown for televising the ground display to a vehicle on the surface and for providing discrete information such as a STOP order, etc.

7 Claims, 13 Drawing Figures

FREQUENCY & RANGE SELECTION FOR TAXIWAY & RUNWAY GUIDANCE

U.S. Patent   July 20, 1976   Sheet 1 of 4   3,971,025
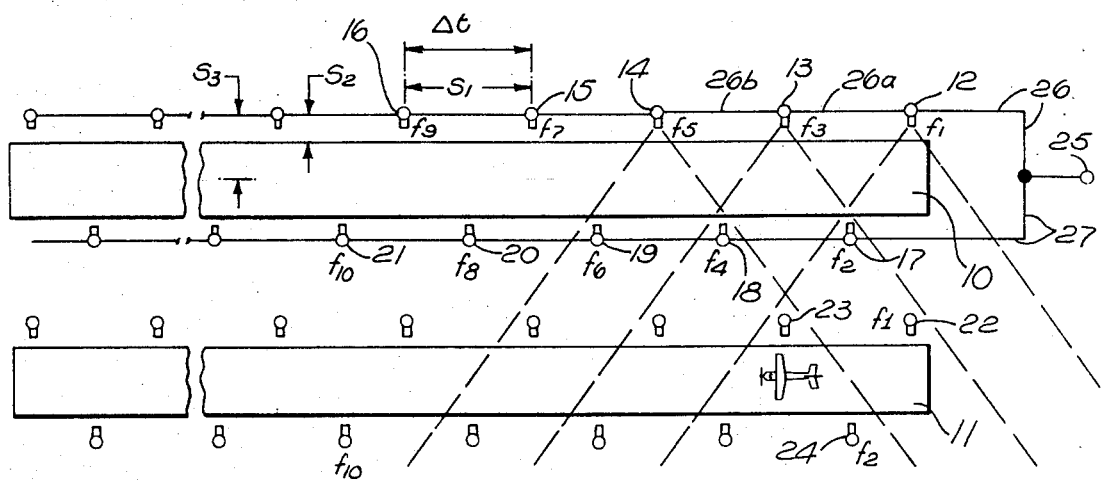
Fig. 1.   FREQUENCY & RANGE SELECTION FOR TAXIWAY & RUNWAY GUIDANCE
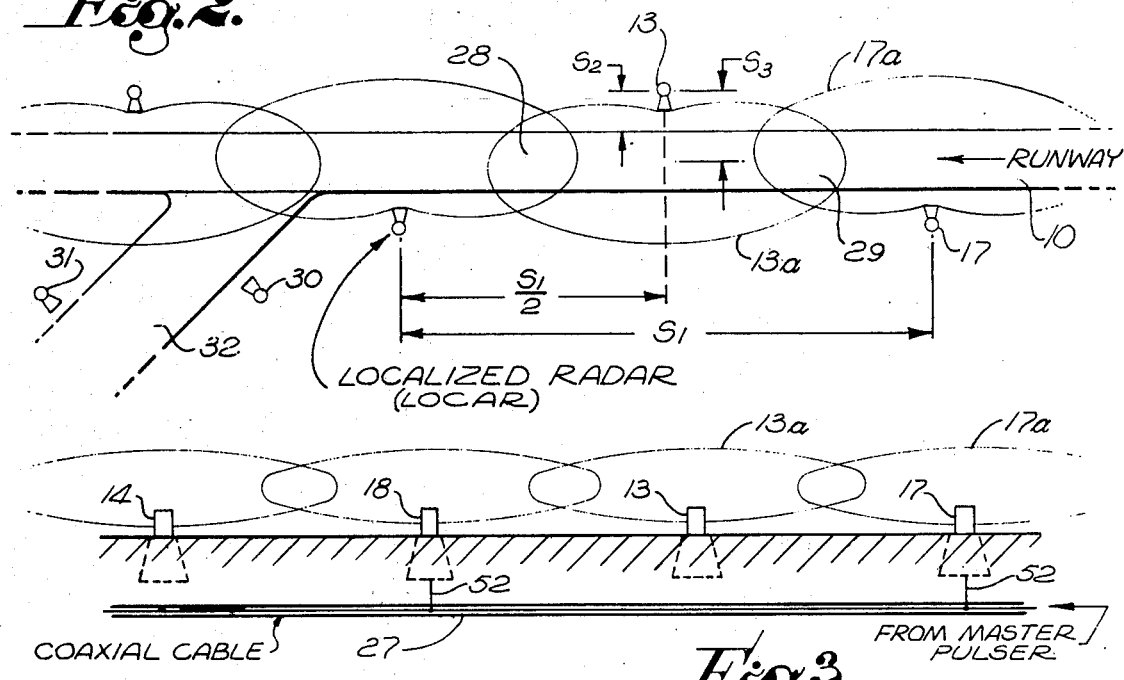
Fig. 2.
LOCALIZED RADAR (LOCAR)
Fig. 3.
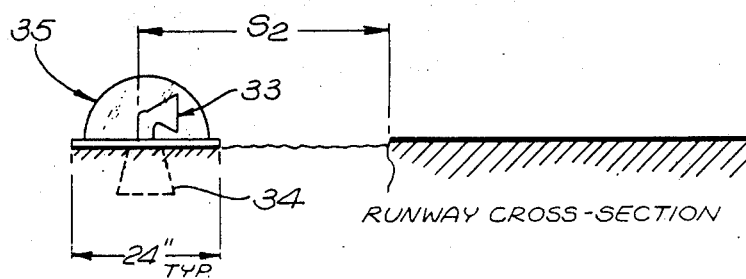
Fig. 4.
RUNWAY CROSS-SECTION

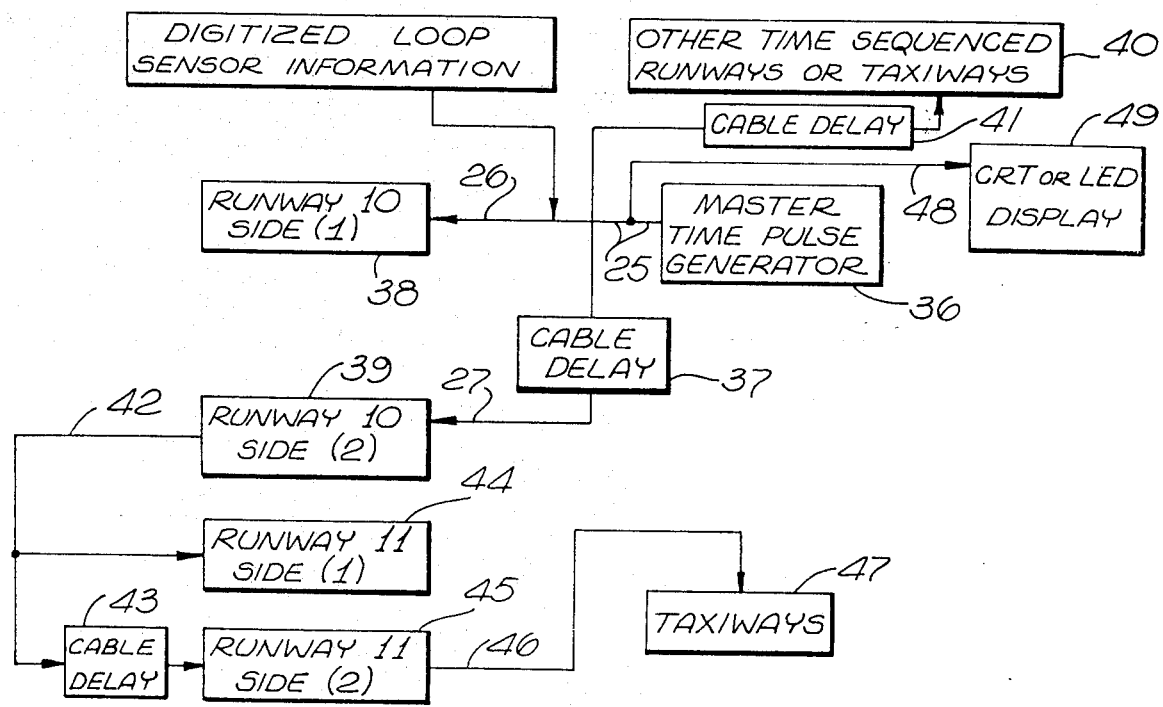
Fig. 5. RUNWAY—TAXIWAY SURVEILLANCE — SIMPLIFIED BLOCK DIAGRAM.
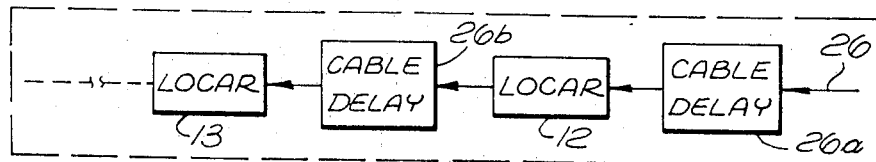
Fig. 5a.
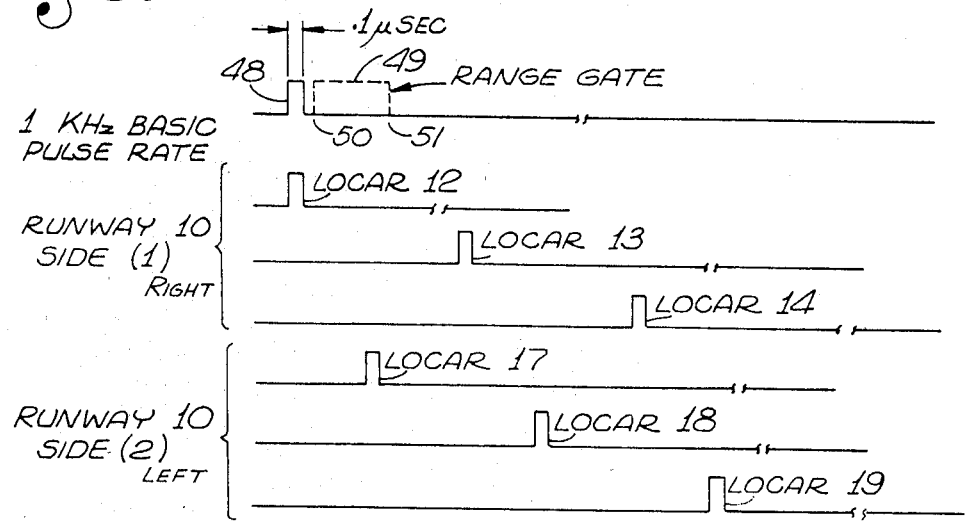
Fig. 6. TIME DIVISION SEQUENCING OF LOCAR PULSES

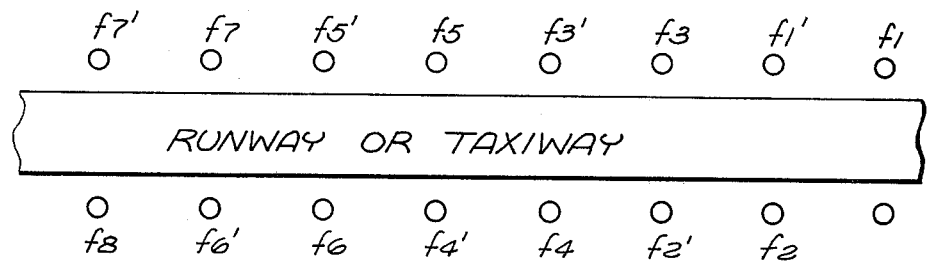
Fig. 10.
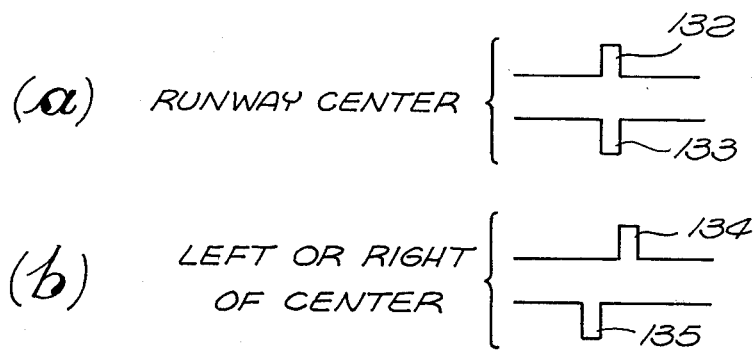
Fig. 11.
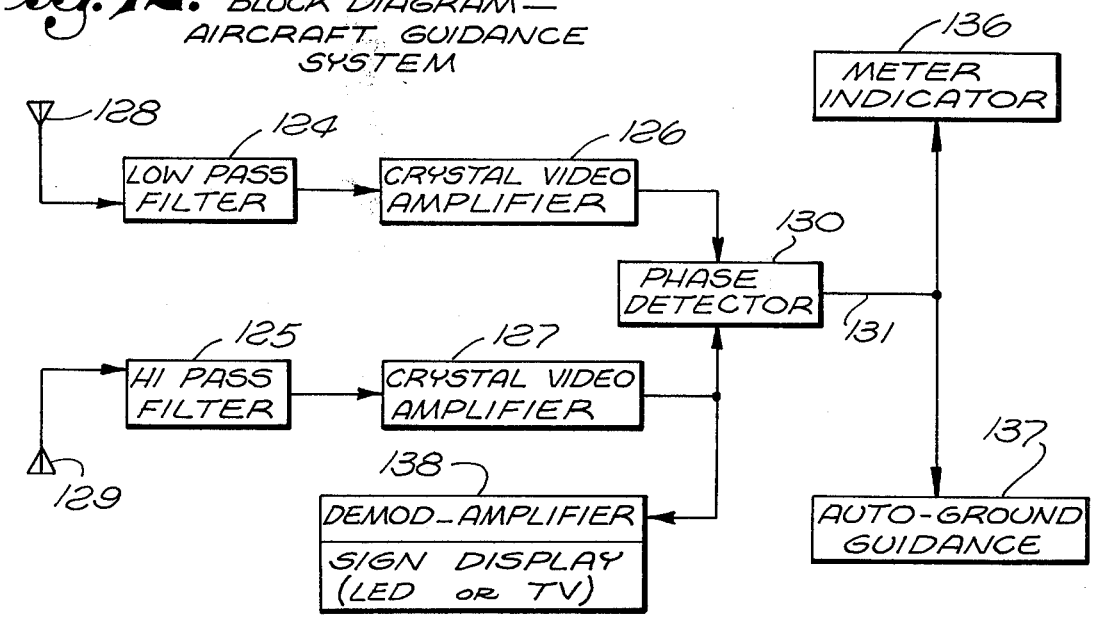
Fig. 12. BLOCK DIAGRAM — AIRCRAFT GUIDANCE SYSTEM

AIRPORT GROUND SURVEILLANCE SYSTEM WITH AIRCRAFT TAXI CONTROL FEATURE

CROSS REFERENCES TO RELATED APPLICATIONS

This is a divisional application of copending application Ser. No. 320,089, filed Jan. 2, 1973, entitled "Airport Ground Surveillance System" now Pat. No. 3,872,474. The benefit of the filing date of said copending application is, therefore, hereby claimed.

BACKGROUND OF THE INVENTION

1. Field of the Invention

The invention relates to electronic detection and control. More specifically, it relates to the surveillance and control of aircraft and other vehicular movements on the runways, ramps and taxiways of an airport.

2. Description of the Prior Art

Airports in major metropolitan areas throughout the world handle large volumes of air traffic, resulting in well-known conditions of congestion, not only in the approach air space, but also on the surface of the airport itself. All types of aircraft making use of an airport have occasion to use runways for landing and takeoff and taxiways to and from these runways. In addition, various ramps and approach ways leading to maintenance and parking areas and to passenger and freight terminal areas are traversed bidirectionally by aircraft of all sizes. In addition to the ground movement of aircraft, trucks and other ground vehicles move about performing specialized tasks on the surface of the airport. Accordingly, a major airport requires some form of overall ground traffic control system. In order to be effective, such systems must be sensitive to a number of variables.

The prior art systems have relied primarily on visual observation and direct radio communication for navigation and control of aircraft and vehicles on the surface of the airport. Pilots and vehicle operators provide their own visual guidance and collision avoidance, while air traffic control personnel issue clearances and information as necessary to maintain safe, orderly and expeditious flow of surface traffic. Whenever air traffic personnel are unable to completely observe traffic on runways and taxiways, etc. (because of darkness, natural or man-made obstructions, precipitation, fog, etc.), the control of ground traffic must necessarily be based only on reports from pilots and vehicle operators. Under these conditions, traffic cannot be controlled in such a way that airport runways, taxiways and gates are utilized efficiently. The result is a considerable increase in pilot and controller workload, radio channel congestion, and operational delays.

Attempts have been made to provide radar coverage of the surface of an airport with high resolution surveillance radar sets operating in K-band and above. Such systems have been only partially successful however, because of inability to locate a reasonable number of such surveillance equipments to eliminate shadowing caused by various structures about the airport surface. Also, the higher radar frequencies used to give sufficient resolution were adversely affected by hydrometeroric phenomena over the relatively long distances involved on the surfaces of modern airports.

The basic requirements for an all weather surface guidance and control system to fill the general requirement can be stated as follows.

a. The system must provide aircraft and ground vehicles with information required for navigating within their movement areas during all weather conditions; this including the capability for locating and proceeding to a predetermined area or site anywhere on the airport surface.

b. The system must provide air traffic control personnel with information concerning the position of all aircraft and vehicles operating within the airport movement area and the relationship to each other as well as to runways, taxiways, intersections and fixed objects.

c. The system must provide an overall control arrangement adapted to be expanded from a basic location and path control system to a fully automatic routing system, ultimately with computer direction.

d. Additional equipment in aircraft and vehicles must be lightweight, compact and relatively inexpensive, as well as compatible with other equipment currently in use.

As aforementioned, visual and pilot reportage methods obviously cannot fulfil the aforementioned general requirements in all weather conditions. For reasons also given, the surface surveillance radars of the PPI type, or similar (usually employing the K-band), fall short of these requirements.

The manner in which the present invention provides solutions to the problems of the prior art, as discussed, and fulfills the general requirements recited, will be apparent as this description proceeds.

SUMMARY OF THE INVENTION

The system of the present invention comprises a series of small, low powered, narrow pulse, transmitting and receiving radars having limited range (on the order of a runway or ramp width) and time sequenced along opposite sides of a runway. The system operates from a remote or master timing pulse generator having a predetermined pulse repetition frequency. During the interpulse period, each of these small radars "blinks" in sequence. The timing sequence takes place automatically due to the inherent delay in the coaxial cable furnishing the master timing pulse. Accordingly, no radio frequency transmission is made through the interconnecting cable, so relatively inexpensive cables such as video frequency coaxial cable can be used with little loss of signal characteristics. The individual small, low powered transmit-receive radar elements, hereinafter referred to as LOCARS (localized cable radar), are contained within a small "igloo-shaped" radome projecting above the ground surface only a minimal amount, so as not to present any hazard to aircraft or other vehicles.

A relatively simple vehicle-borne receiving unit compares the phase (arrival time) of simultaneously emitted pulses from laterally opposite runway (or other path) locations and develops an error (control) signal to effect vehicle steering to provide for automatic taxi control along said path.

It may be said that the general objective of the present invention is the provision of an airport surface guidance system, providing features as follows:

1. Ability to control all vehicles on runways and taxi ramps in time sequence.
2. Vehicle tracking provided even if slightly airborne.
3. Capability of determining and indicating aircraft speed.
4. The system is easily displayed and relayed to pilots via standard closed circuit television (CCTV).

5. Reduced interference (RFI).
6. Aircraft taxiway-runway guidance capability.
7. No concrete work required for installation (low cost).
8. All weather.
9. Stationary vehicles as well as moving vehicles are indicated.
10. Independent of runway length.
11. No high power radiation near plane, passengers, or ground personnel.
12. No moving parts.

The manner in which the objectives and performance features of the system of the present invention are effected, as well as other capabilities and aspects of the novel system, will be described in greater detail hereinafter.

BRIEF DESCRIPTION OF THE DRAWINGS

FIG. 1 is a typical parallel runway arrangement showing LOCAR units in place in accordance with the present invention.

FIG. 2 is a plan view illustrating typical LOCAR unit radiation patterns.

FIG. 3 is an elevation view showing typical LOCAR radiation patterns.

FIG. 4 is an elevation view of a typical LOCAR unit in place alongside a runway.

FIG. 5 is a block diagram of the overall system in accordance with the present invention.

FIG. 5a is a detail of certain blocks of FIG. 5.

FIG. 6 is a waveform diagram showing typical pulse transmission time relationships applicable to FIG. 5.

FIG. 10 is a runway LOCAR arrangement for providing lateral position data and control from a LOCAR system.

FIGS. 11a and 11b are typical waveform diagrams depicting the relationship of pulses from laterally opposite LOCAR units, in accordance with FIG. 10, as received at the vehicle.

FIG. 12 is a functional diagram illustrating guidance and control functions for use with the system of the present invention with relation to FIGS. 10 and 11.

DESCRIPTION OF THE PREFERRED EMBODIMENT

Figure 7:
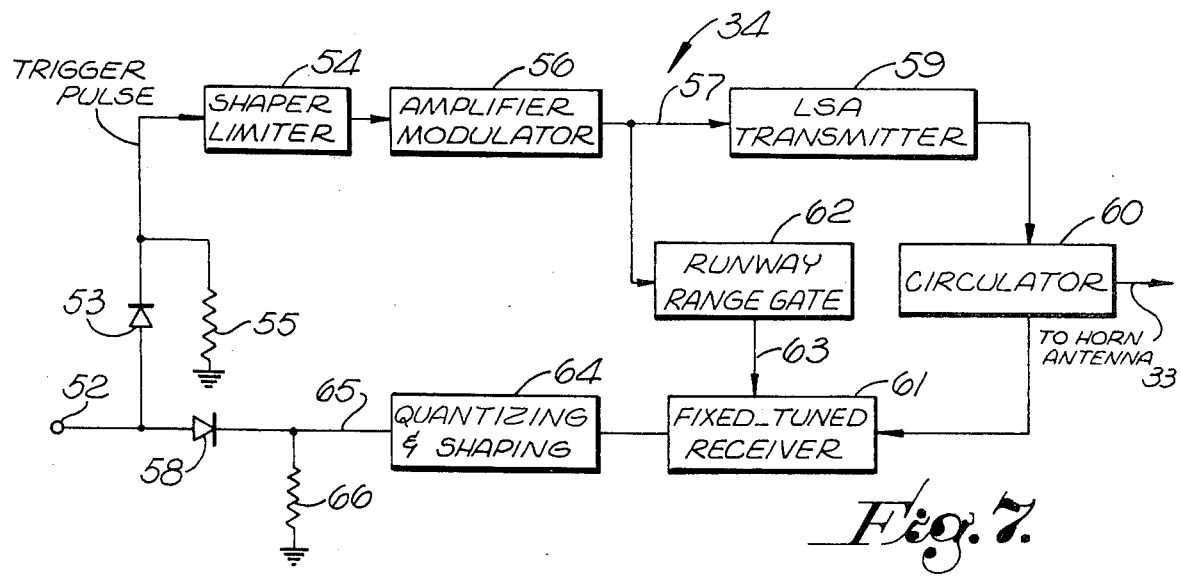
FIG. 7 is a detailed block diagram of a typical LOCAR unit.

FIGS. 1, 2, 3 and 4 of the drawings are devoted to illustration of a typical arrangement for locating the individual LOCAR units. In FIG. 1, two parallel runways are shown, this being a more or less typical runway configuration for a busy metropolitan airport. These runways are identified as 10 and 11, respectively. The individual LOCARS are distributed in two parallel off-set lines on opposite sides of the runway in each case. In connection with runway 10, more detail is illustrated as to the connection of the LOCARS with the video frequency trigger-pulse carrying cable, however it is to be understood that the similar arrangement would apply to runway 11.

One side of the runway 10 will be seen to be provided with LOCARS beginning with 12 which is approximately adjacent to the beginning or right end of the runway as depicted in FIG. 1. At equal intervals, LOCARS 13, 14, 15 and 16 and also the remaining units along that side of the runway are disposed. This spacing along the runway length dimension is identified on FIG. 1, as $S_1$. The corresponding time delay between adjacent LOCARS is identified as $\Delta t$. These values $S_1$ and $\Delta t$ are not only typical of LOCAR unit spacing on that side of the runway, but also apply to LOCARS 17, 18, 19, 20, 21, etc., on the opposite side of the runway. One significant difference will be noted however, in that this second line of LOCARS is staggered with respect to the first line. That is to say, unit 17 has a location between units 12 and 13 in terms of spacing measured along the runway centerline.

As has been indicated, it is desired that the individual LOCARS transmit very short pulses, and that these pulses be spaced by the inherent trigger cable delay. The master timing pulse in the case of runway 10 is applied at 25, and this cable divides into two cables 26 and 27, which proceed down opposite sides of the runway as indicated in FIG. 1. Length between LOCARS (typically 26a and 26b) are equal. It will be evident from FIG. 1 that LOCAR unit number 12 would be the first to blink, followed by 17, 13, 18, 14, etc.

Although the cable feeds for the runway 11 are omitted from FIG. 1, it will be understood that the configuration is substantially identical to that illustrated for runway 10, except that the input to the elements disposed alongside runway 11 is timed subsequent to the completion of the total "scan" of runway 10. In effect, the LOCAR blinking of LOCARS 22, 24 and 23, and the remainder of the LOCARS along runway 11 in sequence, is accomplished by series connection of the cables from the end of runway 10 back to the beginning of runway 11.

Referring now to FIG. 2, a portion of the runway 10 is illustrated to show the overlapping patterns of the individual LOCAR units. It will be noted, in particulary, that the individual LOCAR patterns are overlapping. Typically, an area 29 will be seen to be overlapped by patterns 17a and 13a from LOCARS 17 and 13, respectively. The significance of this overlap will be apparent as this description proceeds.

In both FIGS. 1 and 2, the physical spacings S1, S2 and S3 are illustrated. In a typical embodiment, these spacings could be on the order of 600 feet for S1, 50 feet for S2 and 50 feet + one-half of the runway width for S3, for a 0.1 microsecond transmitted pulse width.

On FIG. 2 an arbitrary taxiway 32 is shown joining runway 10. The programming of the LOCARS 30, 31 and the remainder of the LOCARS extending along 32, possibly leading to a parking area or terminal point, would be programmed in order in the series relationship spoken of in connection with runways 10 and 11. That is, at sometime during the interpulse period of the master timing pulses introduced at 25, elements 30, 31, etc, would be caused to blink.

An arbitrary, but typical pulse repetition frequency for a system in accordance with the present invention, would be on the order of 1000 Hz. Thus, there is an interpulse period of 1000 in microseconds between adjacent master timing pulses, a sufficient time to permit the serial scan by means of successively blinking LOCARS along a number of programmed runways, taxiways, etc., on a given airport surface.

It will be noted that frequency symbols $f1, f2, f3, f4$, etc., up to $f10$, are associated with the individual corresponding LOCARS 12, 17, 13, 18, etc. Typically, there are 10 different LOCAR frequencies used to provide a type of frequency staggering. All large airports have the typical parallel runway configuration and also have various buildings, towers, etc., located near the runways. Thus, there is a "late return" or "second time around" echo problem inherent in a system according to the present invention. To avoid this problem, the frequency staggered system is used. All LOCARS to the left of the runway are arbitrarily placed below center reference frequency and all those to the right side are above center reference frequency (the order may be reversed). The sequence of 10 different frequencies falls within the video bandwidth required for the selected transmitted pulse, namely, a band of approximately 16 MHz. As the transmitted pulse returns from LOCAR 12 (operating at f1) into the horn of LOCAR 13 (operating at f3), no indication is obtained since LOCAR 13 does not respond to $f1$, but only to its own frequency $f3$.

It will be noted, that in accordance with the typical spacings and parameters mentioned, 35 individually sequenced LOCARS blinking at 0.5 microsecond intervals, would cover a typical runway on the order of 2 miles long. Only 17.5 microseconds would be utilized out of the total of available 1000 microsecond interpulse periods for covering such a runway. Accordingly, the next interval, which may be more or less than the 17.5 microseconds aforementioned, could be used for the next runway or taxi ramp, depending upon the airport configuration, and the most efficient cable layout for the particular airport concerned. From this, it will be apparent that discrete time intervals within the said interpulse periods are discretely associated with the various runways, taxiways, etc.

A combination of factors control the resolution obtainable with the system according to the present invention. Most of the conventional parameters, including pulse width, range gating and antenna patterns apply.

In order to obtain digitized lateral resolution, a pulse of 0.1 microseconds has been arbitrarily selected as typical for the LOCAR transmission pulse width. From this, comes the requirement that the LOCAR be spaced approximately 50 feet (i.e., S2 = 50 feet) from the edge of the runway.

FIG. 3 is a self-explanatory elevation view of substantially the same situation as depicted in FIG. 2 and may be considered in connection with the foregoing discussion of FIG. 2. In addition, however, FIG. 3 shows the runway (left side) cable 27 as parallels runway 10 in FIG. 1.

FIG. 4 is also self-explanatory, showing a typical LOCAR installation at any of the points 12, etc., from FIG. 1. A rectangular aperture horn 33 is provided, since it is simple and can readily produce the horizontal and vertical patterns of FIGS. 2 and 3. The individual LOCAR electronic circuitry in the block 34 will be described in detail in connection with FIG. 7 hereinafter. A typical plastic radome 35 protects the LOCAR unit and minimizes the hazard to aircraft and other vehicles which are, for any reason, off the runway or ramp at any time.

Referring now to FIG. 5, a system block diagram is shown. The so-called master timing pulse at the system pulse repetition frequency is produced by master time pulse generator 36. The output lead 25 generally corresponds to that depicted in FIG. 1, and here the trigger pulses (typically spaced 1000 microseconds as aforementioned) appear. The individual runway sides depicting the LOCARS on the respective sides of runway 10, for example, as represented by blocks 38 and 39. The cable delay 37 represents the difference in length of cables 26 and 27 proceeding from point 25 to LOCARS 12 and 17, respectively. Other time sequenced runways or taxiways are illustrated by the block 40, and it is to be understood that cable delay 41 is that which is appropriate to place such other runway or taxiway in its proper time "slot" within the pulse repetition interval of the system. The last LOCAR to blink in connection with runway 10 would be the last one on the left side (side two which includes LOCARS 17, 18, 19, etc.). From this, a cable continuation 42 connects to side one of runway 11. The function of cable delay 43 will be readily understood from the foregoing discussion of cable delay 37. That is to say, that there would be a cable length difference between the excitation of LOCARS 22 and 24, and that cable delay or time differential is represented by 43. The right (side 1) LOCARS of runway 11 are represented at 44 and the left, or side 2, elements by 45. A cable 46, from the last element to blink in the sequence for runway 11 (that element being on the left or side 2) proceeds at 46 typically to other taxiways, etc., represented by block 47.

Each of the blocks 38, 39, 44 and 45 contains the individual elements shown in more detail in FIG. 5a. Thus, for example, if it is assumed that the typical showing of FIG. 5 is described in connection with the right, or side 1 elements of runway 10, the first two LOCARS are 12 and 13 and the connecting cable inherent delays through 26a and 26b are as represented.

FIG. 6 indicates the blinking or time sequencing of LOCAR pulses for a more graphic understanding. If pulse 48 on FIG. 6 is taken to be any arbitrary LOCAR timing pulse, or corresponding RF transmitted pulse, it will be noted that a block of time 49 is set aside corresponding to a range gate beginning at point 50 which is near the edge of the runway in each case and ending at 51 which is the far edge of the runway in each case. The remainder of FIG. 6 graphically illustrates the transmitted pulse locations for each LOCAR as identified. These pulses are readily associated with the configuration of FIG. 5 and with FIG. 1.

The remainder of FIG. 5 will be explained later in this description.

Referring now to FIG. 7, the circuit of the individual LOCAR unit is depicted. The blocks illustrated in FIG. 7 generally correspond to the circuitry in 34 of FIG. 4. In each LOCAR unit, a common input-output terminal 52 is utilized. The synchronizing pulse from unit 36 of FIG. 5 passes through diode 53, but not diode 58. The impedance 55 serves to provide impedance matching for the connection of 52 at the junction with the cable in each case. Thus, the trigger pulse applied to the shaper-limiter 54 and amplifier-modulator 56, is formed into a power pulse of the desired rectangular characteristics to be used as a transmitter-modulator pulse. The nature of such circuits as 54 and 56 is well understood in these arts. The output pulse on lead 57 from amplifier-modulator 56 is applied to LSA transmitter 59. Since the individual LOCAR units operate over very small ranges, comparatively little microwave power is required from each LOCAR unit. A very practical unit for the transmitter 59 can be provided through the use of a Galium Arsenide microwave power generating diode, sometimes referred to as an LSA (Limited Space Charged Accumulation Mode)

diode. This so-called LSA diode is a solid state device, requiring no heater power or other auxiliary voltages as would be the case with magnetron or klystron circuits or the like. The LSA diode is a particularly attractive solid state microwave generator from another point of view in that it is stable and reliable and its internal parameters do not affect frequency. Accordingly, the tuned external circuits determine the frequency of oscillation. It follows that, when these external circuits are made stable, they will form a stable oscillator in combination with the LSA diode.

There are other devices, such as the so-called Gunn diode, which are relatively attractive as microwave generators in a system according to the present invention. These, as well as the LSA devices, are well known to those skilled in these arts.

As employed in the system claimed in the aforementioned U.S. patent application Ser. No. 320,089, present application receiving functions are required at the individual LOCARS, and visual display means on the ground. These are also herein described so that the utility of the present invention will be understood within the larger system.

A circulator, or hybrid circuit 60, channels the microwave pulse output from 59 to the horn antenna 33 (See FIG. 4) in a well-known manner. Similarly, echo energy received at the horn 33 is passed by the circulator 60 to the fixed-tune receiver 61. Here again, some of the simplest radar receiver technology is applicable. Since the range is very low, such receivers as the crystal video type with cavity tuning, could be expected to perform satisfactorily in the receiver block 61. Solid state circuits are again appropriate for this circuit 61, in order to maximize the operational reliability and minimize the maintenance required.

Runway gate generator 62 is the device which produces the range gate 49 illustrated on FIG. 6. This device generates a rectangular enabling gate which is applied via lead 63 as a gain controlling function to receiver 61. Thus, receiver 61 is only capable of receiving echo signals during the enabling gate applied at 63. The actual width of the gate in feet (distance equivalent) is selectable to accommodate runways or approach ramps, taxiways, etc., of various widths. A range of adjustment of this enabling gate running between 50 and 300 feet would be nominal and typical.

In accordance with the foregoing, it will be realized that the output of the receiver 61 contains only signals during the range enabling gate applied at 63. The quantizing and shaping circuits 64 amplify and may provide a minimum threshold for signals passed to its output lead 65. Also, circuit 64 includes an inverter circuit if the output pulses of the receiver 61 are positive. The polarity of pulses from 61 is, of course, a matter of design; accordingly, it is possible to provide negative going signals as outputs from 61, in which case the circuit 64 need not include an inverter. Suffice it to say, the signal at 65 is the second signal illustrated in the signal pair of 58, the first signal being that applied at 52 from the cable at the particular location. Another matching impedance 66 applies to the negative signals which pass through diode 58 and onto the line 52, but not back through diode 53, to provide a suitable driving source impedance in the reverse direction.

Figure 8:
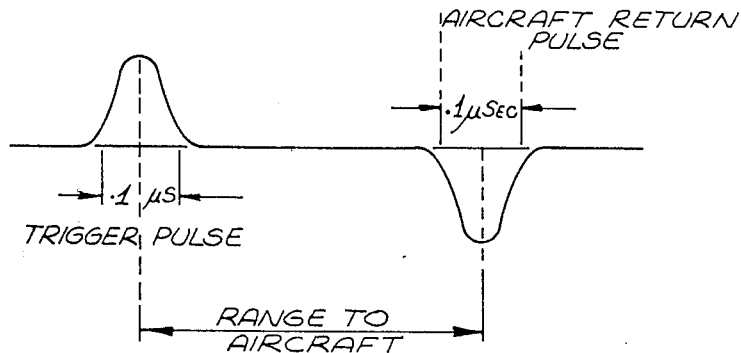
FIG. 8 is a waveform diagram of typical individual LOCAR transmit and receive pulses.

From FIG. 8, it will be realized that the time of occurrence of the second pulse, after the first, depends not only upon the cable distance but also upon the lateral distance from the vehicle on the runway to the LOCAR unit in each case. The negative received signal pulse travels backwards through the cable which supplies the synchronizing pulses from unit 36. An extension of this cable 48 (refer back to FIG. 5) carries the negative going signals to the control display unit 49 which do not act as triggers for any other LOCAR units. Similarly, transmitter triggering pulses of positive polarity are accepted to synchronize the unit 49.

As has been indicated before, the scan of each runway by the unique LOCAR blinking or sequencing operation described places data from each runway in a discrete range bin within each pulse repetition interval of the system. From knowledge of that basic fact, a straightforward cathode-ray display may be provided to present the data of FIG. 9. The system synchronizing pulse has a typical pulse repetition frequency of 1000 Hz if used as a sweep synchronizing signal. The cathode-ray display would be of the sequence type, as known in the radar arts, and that device is inherently accurate and capable of showing a maximum amount of information. For example, in the upper left-hand corner of FIG. 9, a representative piece of ancillary data (comprising an under-and-over speed alarm) may be presented. In the upper right-hand corner any particular flight could be discretely identified by means of a closed circuit interrogation loop including the LOCAR units and an airborne transponder.

Figure 9:
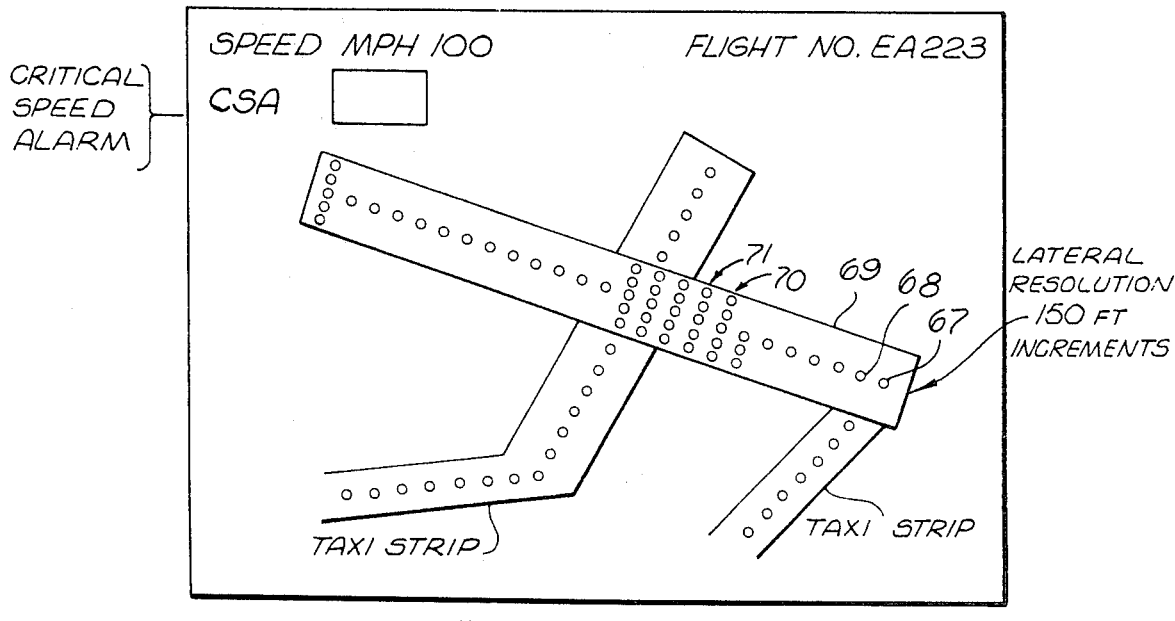
FIG. 9 is a typical display of LOCAR derived data in accordance with the present invention.

A simpler and less expensive type of display, which in many respects is ideally suited as part of the present LOCAR system, involves the use of miniature LED's (light emitting diodes) arranged as individual resolution elements on a map to simulate all resolvable positions on the complete airport surface in accordance with FIG. 9. It should be pointed out that on FIG. 9, LED elements 67 and 68 might be the first two center resolution elements for the first two LOCARS along a runway arbitrarily depicted at 69. Actually, there are a plurality of lateral resolution increments across the runway at each LOCAR position, as depicted at range positions 70 and 71.

In the LED display, each of the positions 70 and 71 would comprise 5 (an arbitrary number) LED's corresponding to a center of the runway position and two degrees of variation on each side of center.

The manner in which the LED display is instrumented electronically is described in the aforementioned Ser. No. 320,089, and will not be repeated in detail herein.

The aspect of the overall system of the present invention, of concern herein is the automatic control of a vehicle on the runway or taxiway.

Consider, at this time, FIG. 10; this drawing depicting the addition of a set of interlaced transmit only LOCAR units. The arrangement of FIG. 11 is fundamentally the same as FIG. 1 with the exception that an interlaced set of "transmit-only" LOCAR units is interposed between the LOCAR emplacements depicted in FIG. 1. In FIG. 12, these additional transmit-only emplacements are identified by prime marks. For example, $f_1'$ is between $f1$ and $f3$ which are LOCAR units 12 and 13, respectively on FIG. 1. The unit at $f_1'$ transmits on the same frequency as $f1$. The same is true of all the other $f'$ emplacements, in that they operate on the same frequency as their subscript companion contemplated on FIG. 1. The same cable arrangement, i.e., that of 26 and 27, as envisioned in FIG. 1, applies to the configuration of FIG. 12. It will be seen, however, that the number of blinks is doubled, and that opposite emplacements blink contemporaneously.

Referring now to FIGS. 11 and 12, the functional aspects of the arrangement will be explained in terms of the structure of FIG. 12. If it is assumed from FIG. 12 that the LOCAR emplacements on one side of the runway are slightly shifted (in frequency), with respect to those of the other side, without deviating from the bandpass characteristics of the equipment already described, it will be seen that a relatively simple detecting device according to FIG. 14 can provide automatic directional control on the airport surface. For this purpose, as shown on FIG. 12, high and low pass filtering via units 125 and 124, respectively, each with a corresponding crystal video detector 126 and 127, respectively, can process LOCAR pulses from left and right antennas 128 and 129, respectively. These antennas 128 and 129 are extremely simple and may consist only of a quarter-wave stub or half-wave dipole flush-mounted at a convenient point within the aircraft wing or fuselage surface according to well-known techniques. Since the operating frequency of the LOCAR units might be 3000 or more MHz, the antennas are very small. A phase detector 130 thus receives detected LOCAR pulses from each side of the runway or taxiway and compares them to produce a DC output voltage. Considering now also FIG. 11, it will be evident that FIG. 13(a) represents the pulse inputs to phase detector 130 if the aircraft or other vehicle is equi-distant between opposing LOCAR emplacements, i.e., essentially in the middle of the runway or taxiway. In this situation, the output of phase detector 130 and 131 would be zero, i.e., pulses 132 and 133 are equal and opposite and cancel each other. In FIG. 13(b), pulses 134 and 135 produce an output of one polarity on 131 and of the opposite polarity in the situation where pulse 134 occurs at an earlier time than 135. Meter indicator 136 can be instrumented in the same manner as the localizer portion of the familiar ILS cross-pointer indicator. The same output 131 may also be applied to an automatic ground guidance subsystem 137, which operates a servo-mechanism for actual control of aircraft surface direction, i.e., by such means as controlling the nose wheel steering of an aircraft. This system constitutes a closed control loop so that once the aircraft is automatically steered back to the runway centerline, the error signal and therefore the control function is zeroed out. Such systems for actual steering control in accordance with a control signal are well known and easily implemented by those skilled in these arts.

Once the principles of the present invention are well understood, it will occur to those skilled in this art that the discrete data bits representing the block occupancies, as illustrated on FIG. 9 by LED positions, can provide the basis of computer storage and processing for various traffic control and safety purposes.

Another "fallout" feature of the system of the present invention involves the discrete and selected modulation, as for example, (by FM or otherwise) of any of the LOCAR emplacements. On board an aircraft, this modulation may be readily detected and used to activate a warning sign or other discrete operation on board the aircraft as illustrated at 138 on FIG. 14. That sign might be simply a stop order from the traffic controller. Such pieces of discrete information may be transmitted with modulation rates as low as 400 Hz bandwidth or even lower.

The system described will be recognized as completely compatible with such current devices as aircraft transponders, etc., and does not interfere with ordinary ground-to-air communication or with navigation or landing approach devices.

The word "runway" is defined, as used in the claims, as including taxiways, etc., i.e., all paths useful for aircraft surface movement and movement of surface vehicles.

Various additional modifications and adaptations of the present invention will suggest themselves to those skilled in this art, in addition to those briefly hereabove discussed. Accordingly, it is not intended that the specific showings of the drawings, and this description should be regarded as defining the limits of the inventive concepts. The drawings and this description are intended to be illustrative and typical only.

What is claimed is:

1. A system particularly for traffic control on at least one vehicular pathway over a predetermined portion of the surface of an airport, comprising:
   a symmetrical arrangement of sources of short duration microwave pulses, each of said sources comprising a pair of transmitters oppositely disposed, one on each side of said pathway, a line between said transmitters of said pair being generally normal to the direction of said pathway at the corresponding transmitter pair location;
   a source of timing pulses;
   cable means for conveying said timing pulses successively to said source pairs to cause substantially simultaneous transmission from said transmitters of each of said sources, said sources transmitting in succession along said pathway as a function of the inherent delay provided by said cable;
   and receiving and steering means within a vehicle to be controlled along said path, for detecting said microwave pulses and for controlling said steering means to tend to cause said vehicle to follow said pathway by steering to maintain time coincidence of the detected microwave pulses.

2. Apparatus according to claim 1 further defined in that each of said transmitters includes antenna means having individual radiator patterns such that said symmetrical arrangement of sources provides coverage of said vehicular path including predetermined lateral variations therefrom.

3. Apparatus according to claim 2 in which said antenna means for each of said transmitters provides a half beamwidth not less than half the spacing between adjacent sources in the direction of said pathway.

4. Apparatus according to claim 1 in which the RF operating frequencies of said transmitters in each of said sources on a first side of said pathway are substantially the same, and said transmitters on the opposite side of said pathway are substantially the same but different from the frequency of said transmitters on said first side.

5. Apparatus according to claim 4 further defined in that said receiving means including dual receiving channels, each tuned to one of said RF operating frequencies, said phase detector being connected to compare pulses received in said channels, thereby to develop said error signal.

6. Apparatus according to claim 1 in which the RF operating frequencies of said sources in each transmitter pair are substantially equal but the operating frequencies of adjacent sources are staggered.

7. Apparatus according to claim 1 in which said receiving means within a vehicle includes a pulse phase detector for generating an error signal having a first sense for one time offset relationship between said detected pulses and a second sense for the converse offset relationship, said error signal thereby providing a signal for control of said steering means.

* * * * *